United States Patent [19]

Bet et al.

[11] Patent Number: 4,729,744
[45] Date of Patent: Mar. 8, 1988

[54] DEVICE FOR ASSEMBLING TOGETHER MODULAR BLOCKS OF ELECTRIC EQUIPMENT

[75] Inventors: Robert Bet, Dijon; Henri Pierrot, Longvic, both of France

[73] Assignee: La Telemecanique Electrique, France

[21] Appl. No.: 914,838

[22] Filed: Oct. 1, 1986

[30] Foreign Application Priority Data

Oct. 9, 1985 [FR] France ................................ 85 14917

[51] Int. Cl.⁴ .............................................. H01R 9/24
[52] U.S. Cl. .................................... 439/717; 439/724
[58] Field of Search ....... 339/198 R, 198 G, 198 GA, 339/198 H, 91 R

[56] References Cited

U.S. PATENT DOCUMENTS 4,171,862 10/1979 Krasser ........................... 339/198 H
4,184,733 1/1980 Schmeling ...................... 339/198 H Primary Examiner—Gil Weidenfeld
Assistant Examiner—Thomas M. Kline
Attorney, Agent, or Firm—William A. Drucker

[57] ABSTRACT

The invention relates to a device for assembling modular blocks of electric equipment side by side. The two molded cases of modular elements are first of all coupled together in the manner of a hinge by means of two hooks which fit respectively into two mating housings, then are applied one against the other by pivoting one of the cases, and are finally locked together by means of a flexible tongue which snap-fits on to a mating part of the other case.

5 Claims, 11 Drawing Figures

DEVICE FOR ASSEMBLING TOGETHER MODULAR BLOCKS OF ELECTRIC EQUIPMENT

BACKGROUND OF THE INVENTION

1. Field of the Invention

The present invention relates to a device for assembling modular blocks side by side, more particularly two molded cases housing electric equipment.

2. Description of the Prior Art

Different types of devices are already known for assembling modular elements together side by side. One of these devices, described in the U.S. Pat. No. 4,184,733, comprises an engagement rib extending over the upper edge of one of the elements and engaging in a mating rib projecting laterally from the upper edge of the other element, so as to couple the two elements together hingewise. In the coupled position, the two modular elements are joined side by side by pivoting one of them and are coupled together by means of two reciprocal snap-fit ribs of complementary shape formed respectively on the lower edge of the two elements. However, the fact of coupling the two modules together by means of reciprocal engagement ribs which extend over the whole length of the upper edge of each engagement face of the modules does not guarantee an accurate initial position of the two modules with respect to each other at the time of mutual fitting together of the ribs. For electric equipment modules, the result is a lack of precision in coupling the mechanical connections existing between the modules once assembled together, which is particularly prejudicial from the point of view of operation of the equipment.

OBJECT OF THE INVENTION

The purpose of the present invention is to overocme these drawbacks by providing an assembly device which is simple, ensures an initial precise and stable positioning of the modules with respect to each other so as to obtain precise and reliable coupling of the mechanical connections between assembled modules and allows a rapid assembly which may be carried out by unqualified staff, particularly by the user, and without using special tools.

SUMMARY OF THE INVENTION

To this end, the invention provides a device for assembling modular blocks side by side, particularly two molded cases housing electric equipment, comprising:
reciprocal engagement means adapted so as to couple the two cases together through turning one case about an axis defined by two elongated bosses projecting from one of its side wall and two mating grooves formed in the corresponding side wall of the other case,
means for locking the two cases assembled side by side, wherein the reciprocal engagement means comprise two hooks projecting along one of the edges of a lateral engagement face of a first case and two mating housings formed in an opposite lateral engagement face of a second case, the hooks engaged in the mating housings allowing the first case to be moved so that the lateral engagement face thereof comes against that of the second case, and the lateral engagement face of the first case has said two bosses which are respectively engaged in said two mating grooves formed in the opposite lateral engagement face of the second case when the hooks are engaged in the mating housings, and which are disposed respectively with respect to the two hooks so as to define said axis.

In a particular application of assembly between molded electric equipment cases, of the type each having two large parallel lateral faces and, perpendicularly thereto, a front face having a central region forming a step and two lateral regions, a rear face and two narrow opposite lateral faces, with the device of the invention, so-called "light" additional units of the auxiliary contact or voltage emission trip type for example may be added to the main case, for example to a case of a circuit breaker with one or more poles. For this type of additional unit, after engagement of its large lateral face against the large mating lateral face of the circuit-breaker, locking is preferably provided by means of a flexible tongue provided on the additional unit while resting transversely on one of the lateral regions of its front face and having, at one of its ends, a projecting nose clipping, by simple snap-fitting of its tongue, on a mating part of the circuit breaker.

Still within the scope of this application, the device of the invention also allows so-called "heavy" additional units, of the electric control block or residual differential current device type for example, to be added to a circuit breaker case having several poles assembled together. For this type of additional unit, once joined side by side with the last pole of the circuit-breaker, locking is provided by means of a single common screw passing through two coaxial openings formed respectively in the additional unit and in the last pole of the circuit-breaker, and engaging on a nut previously placed between the last pole and the preceding pole of the circuit-breaker during assembly of the poles together.

Thus, starting with a multipole circuit breaker case, it is possible to add thereto by means of the device of the invention, on the one hand, on one of its large lateral faces, one or more "light" additional units mounted in nesting fashion and, on the other hand, on its other large lateral face, a "heavy" additional unit. Of course, the invention is not limited to the particular application mentioned above.

According to another feature of the invention, the modular block having the hooks is also provided with a projecting register pin whose position with respect to a mating pocket in the associated block alows the blocks to be assembled together or not. Thus, this register pin responds to a need which is met within the association of electric equipment cases and which consists in making certain additional units non interchangeable with respect to one or several main cases of different kinds or ratings.

BRIEF DESCRIPTION OF THE DRAWINGS

Other features and advantages of the invention will be clearer from the detailed description which follows with reference to the accompanying drawings given solely by way of example and in which.

DESCRIPTION OF THE PREFERRED EMBODIMENT

Figure 1:
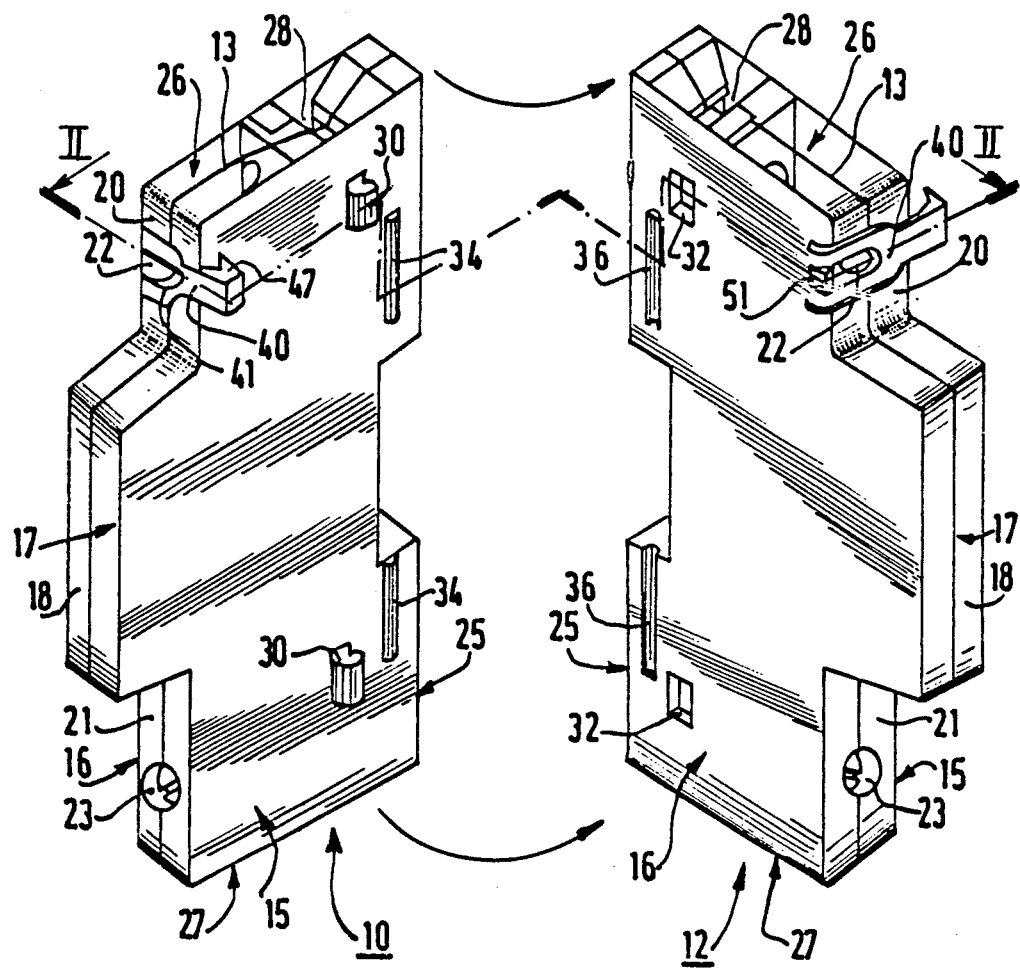
FIG. 1 shows a schematical perspective view of two molded cases of the same kinds, shown in the separated position before assembly.

In FIG. 1 two modular blocks 10,12 have been shown intended to be assembled side by side, and in the case in question two flat molded cases, of the same kinds each containing the component elements, for example of an auxiliary contact, well kown to a man skilled in the art as so-called "light" additional unit for a basic electric apparatus such as a circuit-breaker for example.

The two similar cases 10,12 are each formed of two half-cases assembled together along a plane of symmetry shown by the line 13 in FIG. 1, and each comprises generally two large parallel lateral faces 15,16 against one of which the adjacent case may be applied and perpendicularly thereto:

a front face 17 having a central region 18 forming a step and two side regions 20,21 having access apertures 22,23 to screws clamping electric terminals housed in the case;

a rear face 25 whose profile is adapted for fixing same on a support rail;

two narrow side faces 26,27 having two respective orifices only one of which is visible at 28 in FIG. 1, for inserting electric conductors in the terminals.

There will now be described the means used, and the way of using them, for assembling together the two auxiliary contact cases 10,12, in accordance with the invention, with reference to FIGS. 1 to 6 in which case 10 has been fitted to case 12 by their respective mating large lateral faces 15,16, as shown by the two arrows in FIG. 1.

In accordance with the invention, in FIG. 1, case 10 has on its large lateral engagement face 15, two identical hooks 30 projecting therefrom and both disposed in a similar manner close to the rear face 25 which forms the base of case 10. These two hooks 30 are advantageously integrally molded with case 10 and their respective engagement ramps have the same orientation so as to be able to fit jointly at the same angle into two mating housings 32 formed in the large lateral face 16 of case 12.

Figure 2:
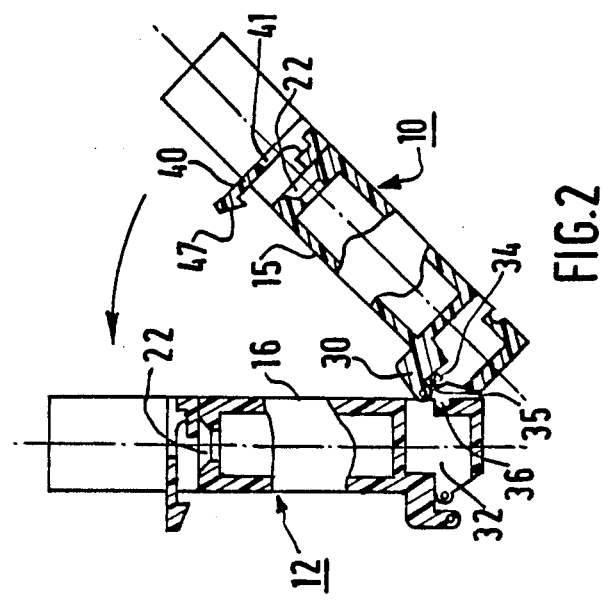

FIG. 2 illustrates the position of case 10, at the beginning of assembly, in which it is brought without hesitation into the coupled position by means of the two hooks 30 which serve as guides thereto and which fit into the mating housings 32.

It is important to note that the face of providing the two hooks 30 close to the base of case 10 allows case 10 to be turned about the line defined by alined bosses 34 and mating grooves 36 so as to engage its side with the side of the other case 12 during assembly thereof.

For this, in FIG. 1, each of the two hooks 30 is associated with a boss 34, of semi-circular cross section for example, formed in the large lateral face 15 of case 10 and extending parallel to the edge of said face while being partially covered by the curved portion of the associated hook, at a distance therefrom, so as to define an internal space 35 (FIG. 2) able to receive subsequently a complementary projecting part.

Thus, at the time of engagement of the two hooks 30 of case 10 in the respective housings 32 of case 12, the two bosses 34 also engage inmating grooves 36 formed in the large lateral face 16 of case 12 and thus serve as key for coupling the two cases together, which allows these latter to be positioned with respect to each other with accuracy and reliability.

Figure 3:
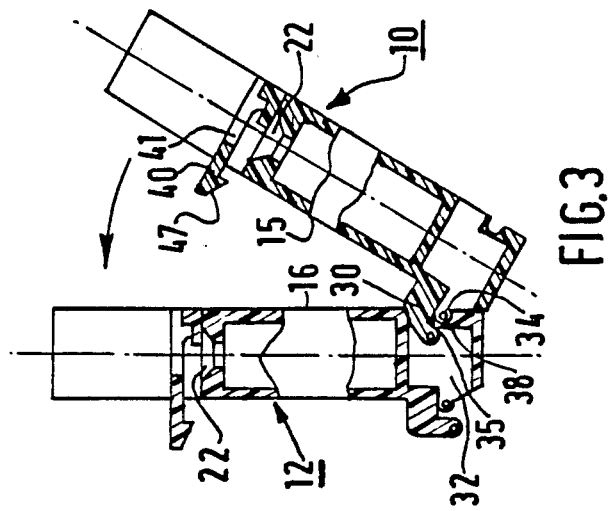
FIGS. 2 to 6 show respectively five successive relative positions of the two cases during assembly thereof, each of the two cases being illustrated in section along the line II—II of FIG. 1.

FIG. 3 illustrates the coupled position of the two cases 10, 12 after respective engagement of hooks 30 and bosses 34 in their housings 32 and grooves 36.

It will be noted that, in this position, the two cases 10,12 are coupled to one another in a particularly stable manner, without the possibility of creating a translational movement of one with respect to the other along two perpendicular axes contained in their engagement plane.

By then pivoting case 10 in the coupled position about bosses 34, in the assembly direction such as illustrated in FIG. 3, each of the two hooks 30 hooks on to an edge 38 provided in the mating housing 32, while bearing on this latter which fits into the internal space 35 situated between said hook 30 and the associated boss 34.

Figure 4:
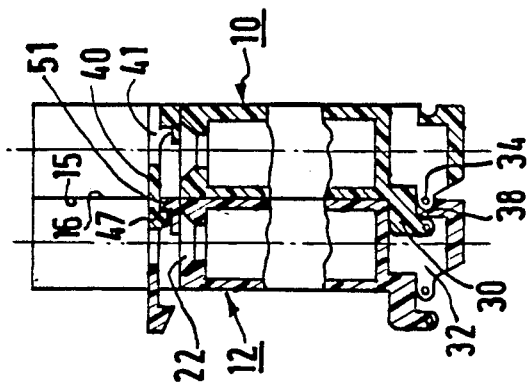

FIG. 4 illustrates this engagement of one of the hooks 30 of case 10 on the mating housing 32 of case 12.

Then, continuing rotation of case 10 in the assembly direction, it is finally applied against case 12.

Figure 5:
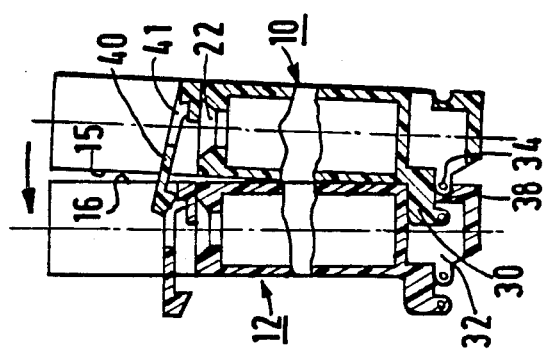
Figure 6:
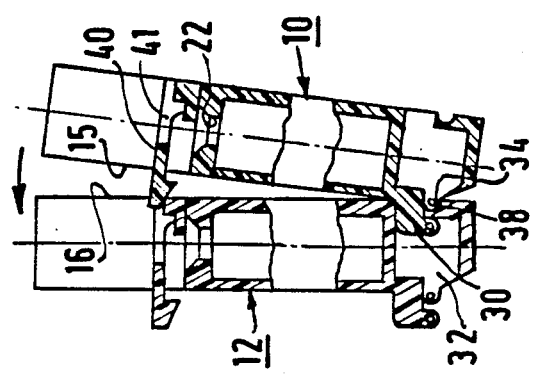

FIG. 5 thus illustrates an intermediate position of case 10 in which its large lateral face 15 is very close to the large mating lateral face 16 of case 12, whereas FIG. 6 illustrates the final engaged position of the two cases 10,12 together with their two large lateral faces 15,16 applied against each other.

The two cases 10,12 in the engaged position are then interlocked by means of a locking system which will now be described.

In an embodiment intended more particularly for so-called "light" additional units such as the auxiliary contact cases 10,12 shown in FIG. 1, the locking system used includes a flexible tongue 40 (FIG. 1) provided on the pivotally mounted case, in the example case 10.

Tongue 40 is disposed flat on any one of the two lateral regions of the front face 17 of case 10, for example on region 20 as shown in FIG. 1, and it is arranged perpendicularly thereto at the level of the access orifice 22 to the corresponding clamping screw for the electric terminal housed in this case 10.

So as not to hinder access to this clamping screw, tongue 40 has a cutaway portion 41 which communicates directly with the orifice 22.

In greater detail, tongue 40 of case 10, which is strictly identical to that shown on case 12 in FIG. 1 is flexibly attached at one of its ends to the large lateral face 16 opposite that forming the engagement face of the two cases. Advantageously, tongue 40 of case 10 is integrally molded therewith and it is contained in the thickness of the wall of the case with which it is integral at one of its ends, so as not to create projections adversely affecting correct engagement of the two cases; the tongue 40 of case 10 ends at its other end in a nose 47 projecting externally of the large lateral engagement face 15 and having the same orientation as the hooks 30 carried by this same face 15.

Thus, during engagement of the two cases 10,12 together by their large lateral faces 15,16 the nose of tongue 40 of case 10 clips, by a simple snap-fit, on a step 51 (FIGS. 1 and 6) provided in the mating orifice 22 of case 12.

FIG. 6 illustrates the two cases 10,12 in their final assembled position, i.e. after engagement together of their large lateral faces and after locking by snap-fitting.

As for dismantling the two cases 10,12, it is readily achieved by first of all raising tongue 40 of case 10 by means of a tool so as to disengage the two cases, then by uncoupling them by pivoting case 10 in the dismantling direction.

Figure 8:
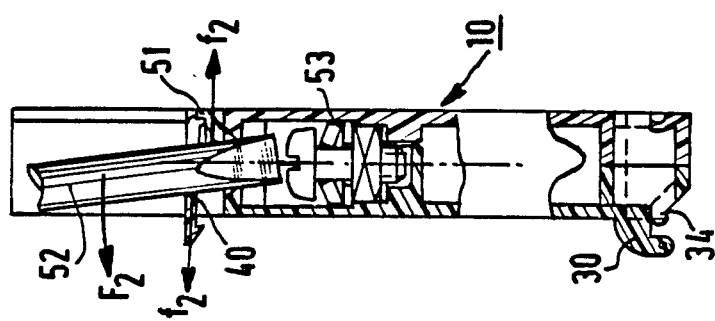
FIGS. 7 and 8 each show a sectional view of one of the cases through the line II—II of FIG. 1, showing the access of a screwdriver to a screw clamping an electric terminal through the tongue, respectively in two positions of the screwdriver.
Figure 7:
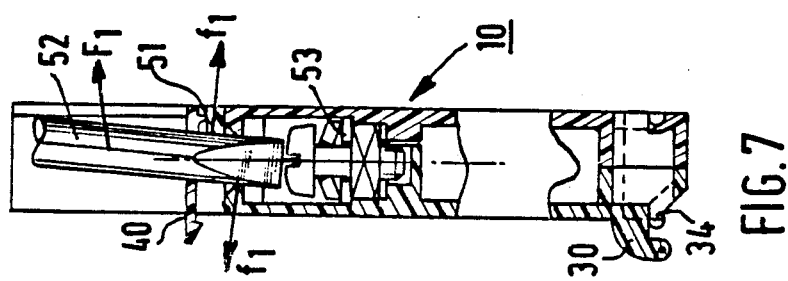

In FIGS. 7 and 8, a tool has been shown at 52, such for example as a screwdriver which passes through tongue 40 in case 10 so as to access the clamping screw of the electric terminal shown at 53 in these FIGS. 7 and 8. It will be noted that in the case where the operator for accessing the clamping screw, exerts a force transverse to the joint plane of the two half-cases forming case 10, this force does not separate the two half-cases.

In fact, if a force is exerted in the direction of arrow $F_1$ in FIG. 7, the components $f_1$ of the torque are applied to the same half-case, step 51 being carried by the left-hand half case in FIG. 7, so that said force remains internal to this half-case and so does not cause any interaction of one half-case with the other.

In the case of a force exerted in the direction of arrow $F_2$ in FIG. 8, the component $f_2$ of the torque are then applied respectively to the tongue 40 of the right-hand half-case and to the step 51 of the left-hand half-case; each half-case then tends to be applied with greater force on the other, thus confirming closure of the case.

It goes without saying that case 12 similar to case 10 also includes the same assembly means described above, so as to be itself assembled to another identical case and so on so as to form a nesting stack which is only limited by the number of couplable mechanical functions.

In addition, in the case where the two cases 10,12 each fulfil the function for example of auxiliary contact, they are then added, separately or together, to a main case for example a modular circuit breaker, using the same assembly procedure as described above.

Figure 9:
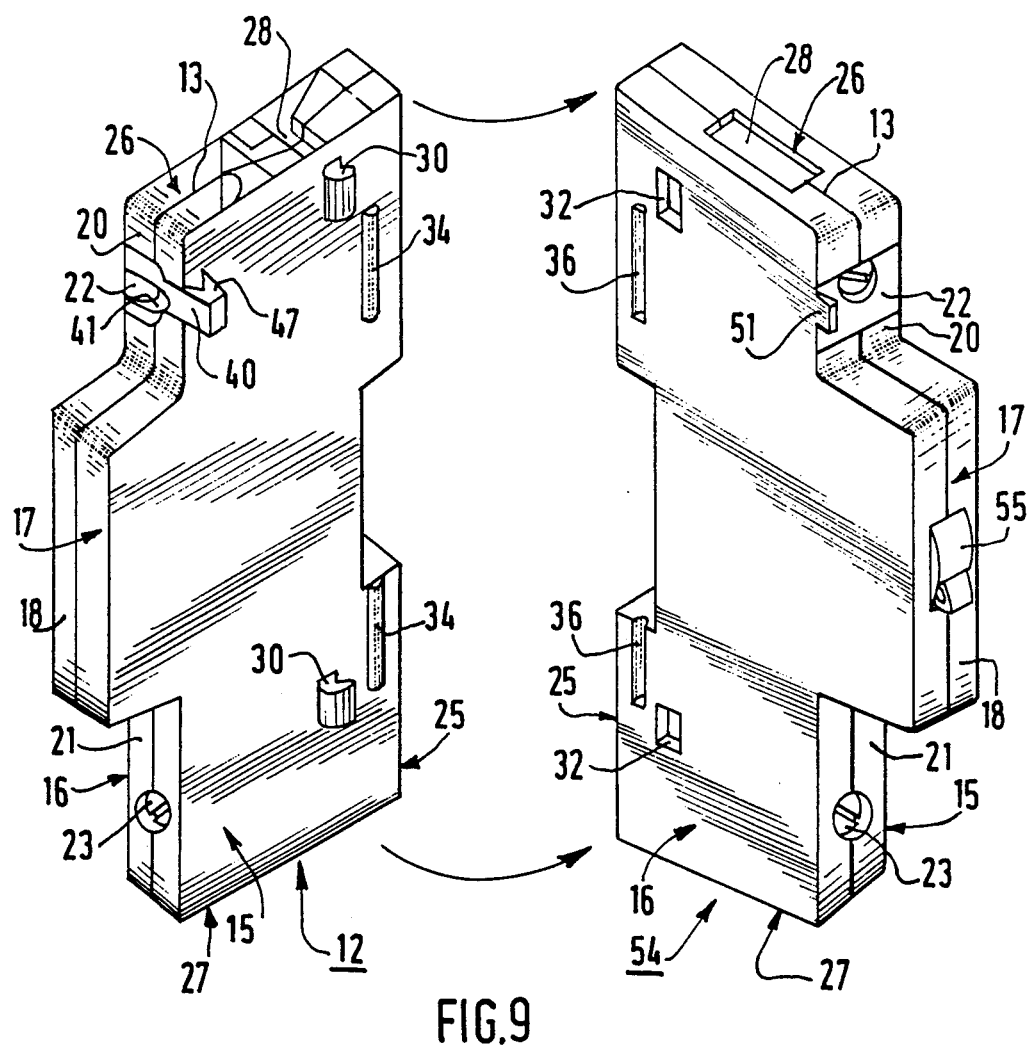
FIG. 9 shows a schematical perspective view of two molded cases of different kinds, shown in the separated position before assembly.

Thus, purely by way of illustration, there has been shown in FIG. 9 in the separated position, the desired addition of a single auxiliary contact case, such for example as case 12 illustrated in FIG. 1, to a modular circuit breaker case 54.

As can be seen in this FIG. 9, the circuit breaker case 54 comprises only the mating parts of the assembly device of the invention; at 55 has been shown the control switch, known per se, carried by the front face 17 of case 54.

A variant will now be described of the system for locking the two cases together once applied against each other, with reference to FIG. 10.

It will be noted that this modified embodiment applies advantageously, but not exclusively, to the so-called "heavy" additional units, such for example as residual differential current device cases. On the other hand, as is well known to a man skilled in the art, this type of additional unit is only applicable to a main case formed of several poles.

Figure 10:
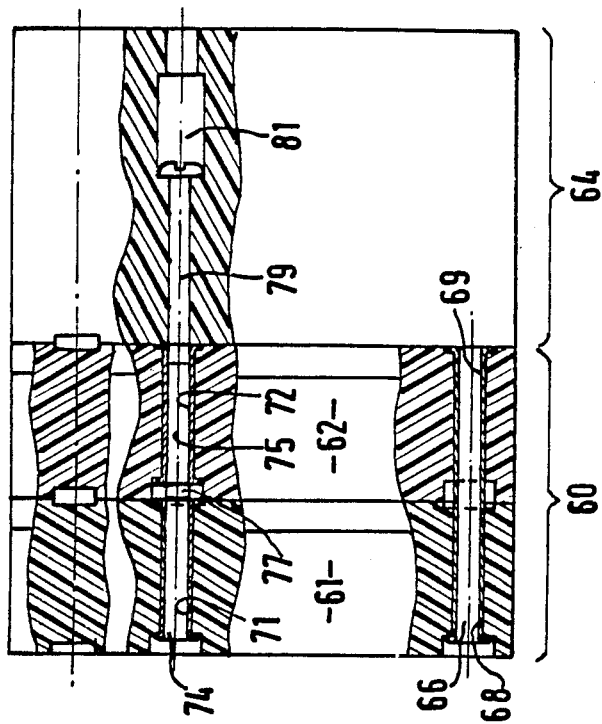
FIG. 10 shows a schematical sectional view of a twin pole circuit breaker case to which is added a "heavy" additional unit with a screw locking system.

Thus, in FIG. 10, a modular case 60 has been shown schematically in section having two poles 61,62, forming for example a twin pole circuit breaker, to which a "heavy" additional unit 64 is added.

First of all, the two poles 61,62 of the circuit breaker are assembled together by means of a connecting rivet 66 extending through two coaxial openings 68,69 formed through the respective poles 61,62.

In addition, the two poles 61,62 are provided respectively with two other coaxial openings 71,72 for passing therethrough two respective hollow rivets 74,75 and a standard nut 77 is interposed, at the time of assembly of the poles, between the two rivets 74,75 while being housed and held in a shoulder provided in each of the poles.

After thus mounting the two poles 61,62, the additional unit 64 is then assembled with the twin pole circuit breaker case 60 and more precisely, for example, with pole 62 of this latter, as shown in FIG. 10, in the following way.

First of all, the additional unit 64 and pole 62 of the circuit breaker case 60 are applied one against the other by their large mating lateral faces, in a way strictly identical with that described above in connection with FIGS. 1 to 6, i.e. by fastening the additional unit on said pole of the circuit breaker case by means of hooks, followed by pivoting of the additional unit so as to apply it against the pole of the circuit breaker case.

Then, the two cases 60,64 applied side by side are locked by a single standard common connecting screw 79 passing through an opening 81 formed through the additional unit 64 and passing through the hollow rivet 75 provided in pole 62, to be finally fixed in nut 77 previously housed and held at the exit of said rivet 75.

As for dismantling the two cases 60,64, it is readily achieved by simply unscrewing followed by uncoupling by causing the additional unit 64 to pivot in the dismantling direction.

It is important to note that this screw locking system has the following advantages:
a single screw is sufficient,
the screw and the nut may be standard,
the screw passes solely through the last pole of the multipole basic product, so that the length of the screw is limited only to a little longer than a pole and is independent of the multipole composition of the basic product.

As can be seen in FIG. 10, the "heavy" additional unit 64 is mounted at the right of the main case 60 with a screw locking system; if desired, one or more "light" additional units of the type illustrated in FIG. 1 may be mounted on the left of this main case, with a snap-fit locking system.

Furthermore, it is known that some additional units must not be interchanged with respect to a main case of different kind or rating: for example, it is desirable to prevent a differential additional unit known to a man skilled in the art to be mounted, whose nominal given rating is less than that of the circuit breaker.

To ensure such non interchangeability of the additional units, on each additional unit a register pin is provided whose position corresponds or not to that of a mating pocket formed in the main case, so as to achieve the desired addition or not.

Figure 11:
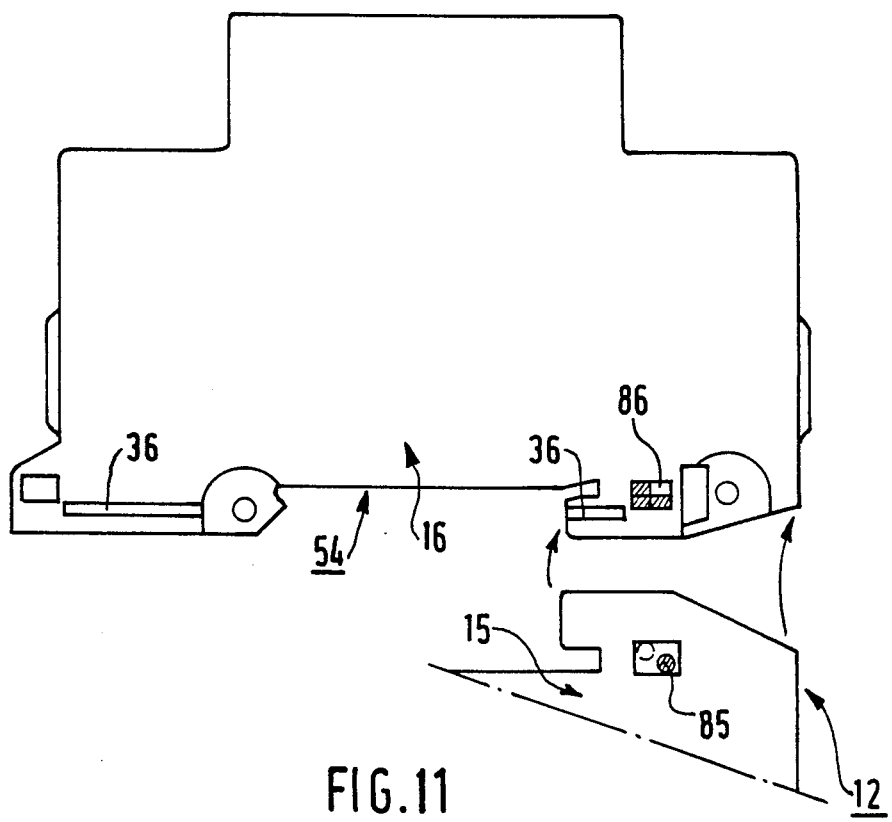
FIG. 11 shows a view of the respective engagement faces of a circuit-breaker case and an additional unit, the face of this latter being illustrated partially and showing solely the register pin provided on the additional unit for adding it or not to the case of the circuit-breaker.

By way of example, in FIG. 11 the large lateral face 16 of the circuit breaker case 54 such as illustrated in FIG. 9 has been shown, against which it is intended to apply the large lateral face 15, partially shown, of the additional unit 12 illustrated in FIG. 9.

As is clear from this FIG. 11, the additional unit 12 has a pin 85 projecting from its engagement face 15 and being molded integrally therewith, and whose predetermined position corresponds to that of a mating pocket 86 formed in case 54 close to one of its grooves 36. Thus, the pin 85 engages in the corresponding pocket 86 during precise facing application of the two lateral faces 15,16 one against the other, so that the desired addition may be achieved.

On the other hand, in the case where pin 85 occupies the position shown with broken lines in this FIG. 11, it is not facing the corresponding pocket, so that said pin prevents in this case assembly of the additional unit with the main case.

It will be noted that the pocket proper to each main case and the corresponding pin of the additional unit may be readily obtained in the respecrtive molds by means of a position pin, known per se.

Of course, the invention is in no way limited to the embodiments described and shown and includes all the technical equivalents of the means described, as well as combinations thereof if they are effected in the spirit of the invention and used within the scope of the following claims.

What is claimed is:

1. An assembly of modular cases each having first and second plane and parallel side walls and front and rear walls substantially narrower than the side walls, the first side wall of each case having upper and lower elongate bosses arranged in a first line substantially parallel to the rear wall and substantially nearer from the rear wall than from the front wall while the second side wall of each case has upper and lower elongate grooves shaped and positioned for snugly receiving the respective upper and lower bosses of an adjacent case in the assembly while allowing turning of one case with respect to an adjacent case about said line, the bosses having positioning end surfaces which cooperate with mating end surfaces of the grooves for positioning the two cases along said first line, the first side wall of each case having upper and lower hook-shaped locking projections arranged in a second line located farther from the rear wall than said first line while the second side wall of each case forms upper and lower housings shaped and positioned for receiving and retaining the respective upper and lower locking projections of an adjacent case in the assembly for locking the first side wall of a case with the second side wall of the adjacent case when, after turning of said second side wall about said first line, said second side wall engages said first side wall, and further means for locking together the adjacent cases when the locking projections are locked into said housings, said further locking means including a flexible tongue integral with each case transversely of the front wall thereof, said tongue having a nose projecting from the first side wall and a projection formed on the second side wall of each case and with which the nose of an adjacent case is snap-fitting.

2. An assembly as claimed in claim 1, wherein said projection is shaped as a step.

3. An assembly as claimed in claim 1, wherein the case is housing an electric apparatus having electrical terminals clamped with a screw and at least one aperture is formed in said front lateral face to allow access of a tool to said screw, said tongue having a cutaway portion which communicates with said aperture.

4. An assembly as claimed in claim 2, wherein each case is formed of first and second assembled half-cases respectively having the first and second side faces and the tongue is formed on the first half-case while the projection is formed on the second half-case and the projection projects through a recessed portion of the tongue.

5. An assembly of modular cases each having first and second plane and parallel side walls and front and rear walls substantially narrower than the side walls, the first side wall of each case having upper and lower elongate bosses arranged in a first line substantially parallel to the rear wall and substantially nearer from the rear wall than from the front wall while the second side wall of each case has upper and lower elongate grooves shaped and positioned for snugly receiving the respective upper and lower bosses of an adjacent case in the assembly while allowing turning of one case with respect to an adjacent case about said line, the bosses having positioning end surfaces which cooperate with mating end surfaces of the grooves for positioning the two cases along said first line, the first side wall of each case having upper and lower hook-shaped locking projections arranged in a second line located farther from the rear wall than said first line while the second side wall of each case forms upper and lower housings shaped and positioned for receiving and retaining the respective upper and lower locking projections of an adjacent case in the assembly for locking the first side wall of a case with the second side wall of the adjacent case when, after turning of said second side wall about said first line, said second side wall engages said first side wall, said assembly further comprising means for locking together the adjacent cases when the locking projections are locked into said housings, said further locking means including a cylindrical opening passing through each of said cases substantially at right angles to the side walls thereof so that, when the first face of a first case engages the second face of an adjacent second case, the openings of these first and second cases are coaxially alined and form a cylindrical passage, and a screw locking device having a screw which extends through said cylindrical passage.

* * * * *